April 30, 1968     W. GLUCK     3,380,117

AUTOMATIC MOLDING MACHINE

Filed Feb. 7, 1966     8 Sheets-Sheet 3

INVENTOR
WILLIAM GLUCK
BY
*Hooper Leonard & Snell*
his ATTORNEYS

April 30, 1968 W. GLUCK 3,380,117
AUTOMATIC MOLDING MACHINE
Filed Feb. 7, 1966 8 Sheets-Sheet 4
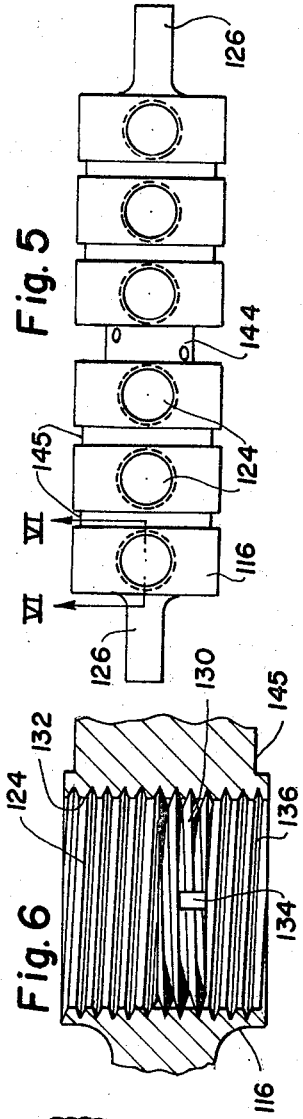
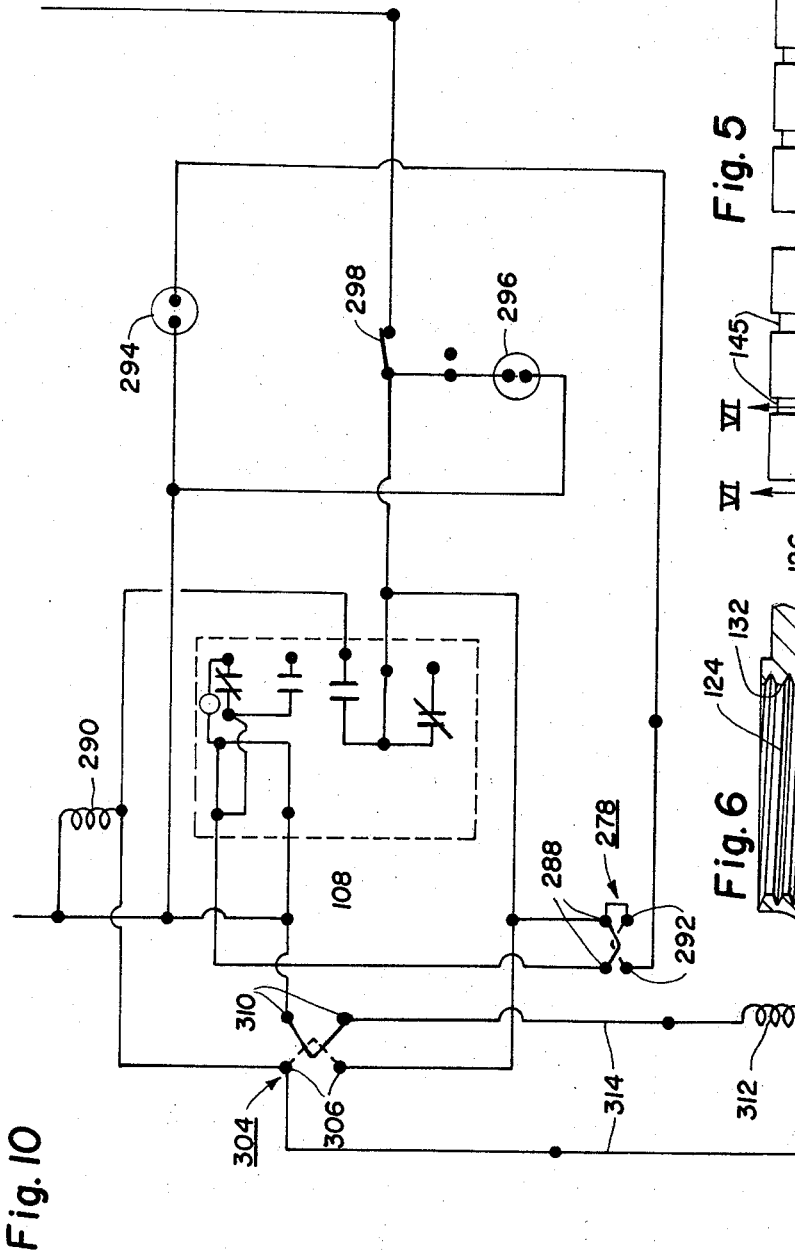
INVENTOR
WILLIAM GLUCK
BY
*Hooper, Leonard & Quell*
his ATTORNEYS April 30, 1968     W. GLUCK     3,380,117
AUTOMATIC MOLDING MACHINE
Filed Feb. 7, 1966     8 Sheets-Sheet 5
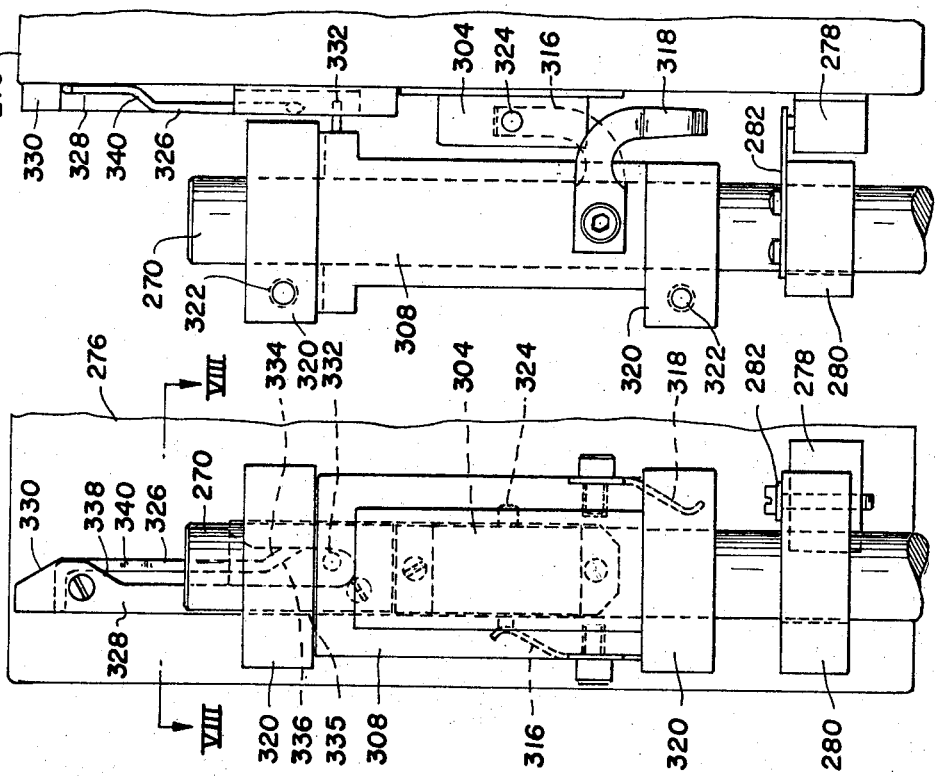
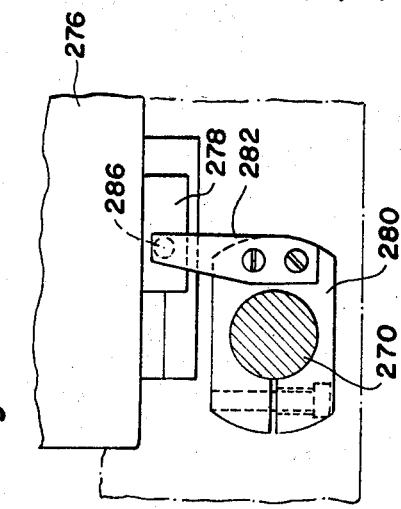
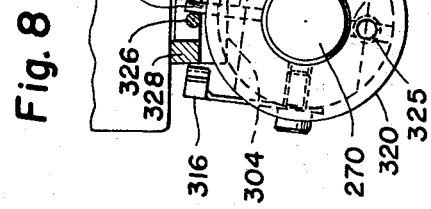
INVENTOR
WILLIAM GLUCK
BY
his ATTORNEYS

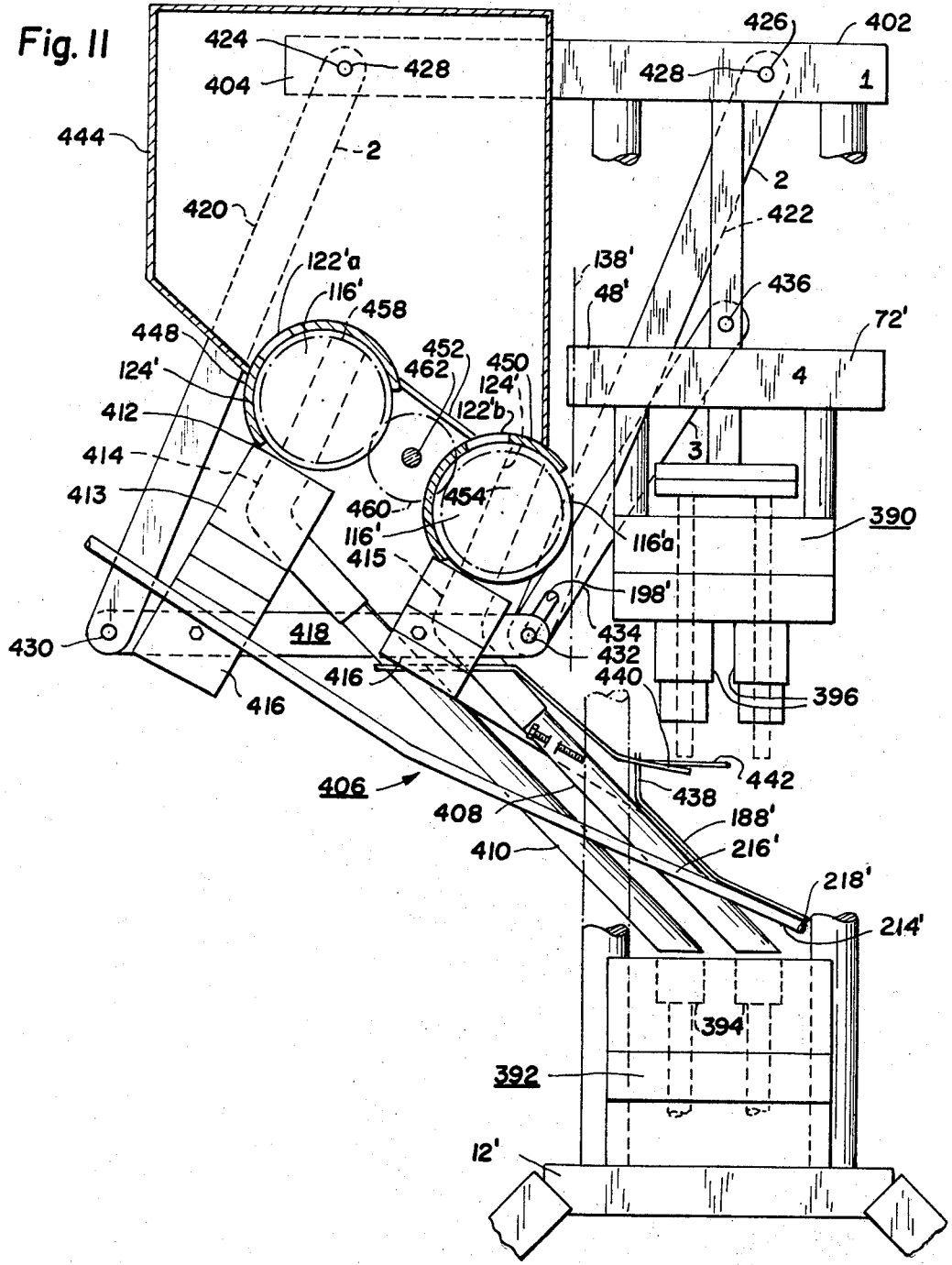

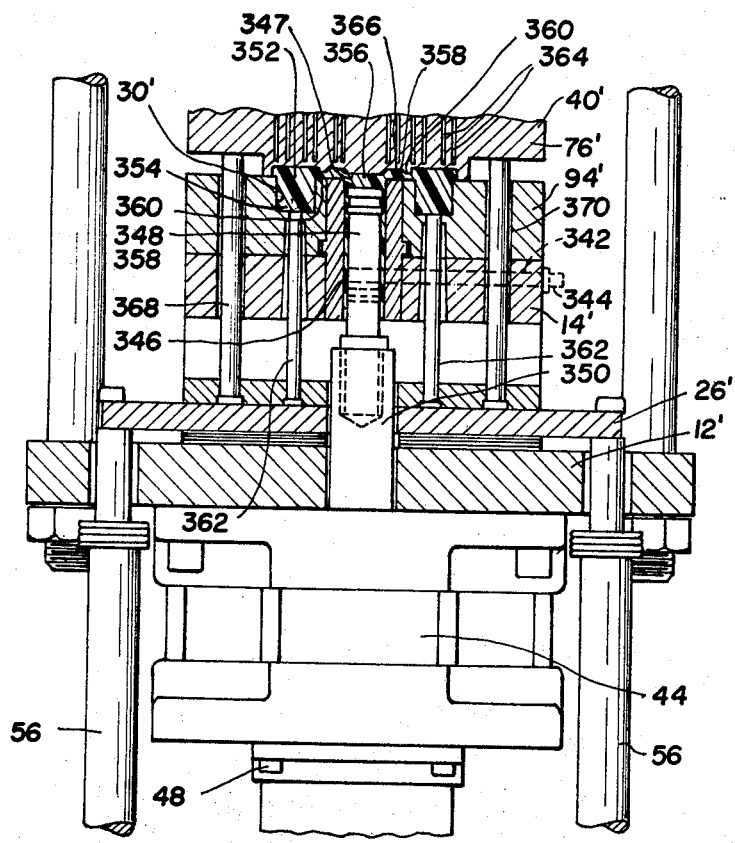

United States Patent Office 3,380,117
Patented Apr. 30, 1968

3,380,117
AUTOMATIC MOLDING MACHINE
William Gluck, Box 315, Monroeville, Pa. 15146
Filed Feb. 7, 1966, Ser. No. 525,732
24 Claims. (Cl. 18—16)

The present invention relates to molding machines in general and more particularly to automatic molding machines capable of unattended operation through an indefinite number of cycles and provided with means for accurately metering and transferring molding powder or the like to the mold cavities of the machine and with means for effectively ejecting the molding articles and for cleaning the mold components after each molding cycle.

The molding machine of the invention is intended primarily for use in the plastic molding industry for the molding of parts from a comminuted solid plastic material. Although not limited thereto, various types of thermo-setting resins and the like are adapted for this purpose and the molding machine of the invention is readily adapted for either compression or transfer molding. It will be understood, of course, as this description proceeds that the molding machine can be used with various forms of molding materials other than those usually termed "plastics."

Most plastic and other molded parts are normally molded in two-part dies which can be closed together and thus cooperate to form a mold cavity in the shape of the part. Usually one of the dies is immovably secured to a base or stationary platen of the molding machine, and the other of the dies is mounted on a movable platen which is rectilinearly moved or reciprocated toward and away from the stationary platen to open and close the mold cavity. In most applications, the dies are designed so that they are moved apart, the molded article will remain on the movable die, which is frequently referred to as the force, and thereby be pulled out of the other die. To aid in removing the part from the stationary die or molding cavity, a lift pin can be associated therewith and is arranged to travel upwardly of the stationary die to aid in loosening the molded part therefrom. In order to eject the molded part from the force with which it remains, means such as an ejector pin extending through the force is used to push the part in the opposite direction of movement of the movable platen to disengage and remove the molded element. In most such molding machines a number of pairs of dies are used in order to justify, production-wise, the expense of constructing and operating the molding machine.

Previous molding machines of the character described have required excessively long operating cycles for automatic or unattended operation owing to the complicated metering, transferring and cleaning mechanisms added to the molding machine. This complicated auxiliary equipment required complex programming mechanisms which frequently malfunctioned with the result of considerable unproductive down-time, especially in those cases where the automatic machines are unattended. Furthermore, the use of such programming mechanisms increases the likelihood of damage to the auxiliary or automatic metering, transferring and cleaning equipment by the movable platen of the machine through programming failures. The added automatic mechanisms and the programming and actuating means therefore also raises considerably the initial cost of the molding machine.

Moreover, the addition of complex automatic mechanisms to the molding machine make it difficult to operate the machine for testing, maintenance, or set-up purposes without operation also of the automatic mechanisms associated therewith. Accordingly, such machines are complicated still further by the addition of required bypass, shut-off or other safety circuits to the automatic equipment.

Therefore, simplicity is ordinarily difficult if not impossible to achieve when increasing speed in automatic molding machines since there are many operations that must be performed. For example, after the press is open, the molded articles must be removed from the stationary dies, then ejected from the movable dies or forces and discharged. The fresh molding material must be metered out of a bin or hopper, transported from the metering means into a transfer mechanism, and the transfer mechanism must be temporarily inserted between the upper and lower platens and discharged into the individual mold cavities or dies. Then the mechanisms employed to remove the molded articles from the stationary dies, to eject them from the forces, and to transfer the fresh molded material must all be retracted out of the way of the upper platen before it is again closed to mold, heat and cure the next group of articles. In the past, all of these operations, even when performed by the various automatic molding mechanism associated with the molding machine, have resulted in considerable time lapse between curing cycles and thus has unduly prolonged the total molding cycle of the machine. Such prolonged cycles have meant considerable lost time and money from a production standpoint, as well as undue heat losses from the molding surfaces.

These difficulties of the prior art are overcome by the present invention which provides a molding machine in which all or substantially all of the automatic mechanisms associated therewith are controlled by movements of the moveable platen in a manner such that the metering, transferring, ejecting, mold cleaning, and other operations are performed within a time period which is a very small proportion of the curing time of the molding material. Thus the overall molding cycle of the automatic molding machine is limited essentially by the curing time of the material being molded. Moreover, the aforementioned automatic mechanisms are manipulated by the upper platen of the machine in such a manner that there is no possibility of any of these mechanisms becoming entrapped between the platens with resultant damage to the molds or to the mechanisms. The disclosed molding machine is provided with a pair of opposed platens to which upper and lower die assemblies or the like can be detachably secure. The lower die plate, for example, can be provided with a plurality of mold cavities of the same or differing configurations while the upper die plate is provided with a number of desirably hollow dies or forces through which the aforementioned ejector pins are protruded. Thus, the die plates can be readily changed with other die plates of generally similar configuration for securance to the fixed and movable platens of the machine, in order to meet production requirements of the machine. The lower die plate desirably also is provided with transverse pin openings extending therethrough at the mold cavities respectively in order to accommodate the aforementioned lift pins which are movably mounted on the lower or fixed platen of the molding machine.

In one modification of the molding machine, the latter is provided with a fixed hopper mounted thereon, in the bottom opening of which novel metering means are provided. The metering means are mounted in spatial cooperation with a movable transfer mechanism whereby the molding powder output of the metering means is transferred respectively to the individual mold cavities. The transfer chute arrangement in one arrangement of the machine is provided with a baffle or shield which is inserted between the platens as they are separated in order to aid in transferring the ejected parts to a suitable storage bin and to prevent flashings from the ejected parts from falling into the mold cavities. The machine also is provided with air ejector means and air sweep means which are likewise inserted between the platens when separated to aid in conveying the ejected molded parts to the storage bin and to blow flashings and other foreign matter out of the mold cavities, respectively.

The metering, transfer, air ejector and sweep means are all controlled by mechanical linkages to the movable platen such that the molding machine is not dependent upon external actuators or programming means or both for operation of the automatic mechanisms. The aforementioned linkages are arranged, however, such that failure therein cannot result in damage to the automatic mechanisms or the molding machine. The linkages are further arranged so that they can be readily adjusted, disengaged or otherwise de-activated in the event it is desired to operate the molding machine without the concomitant operation of one or more of the automatic mechanisms.

For certain applications, the molding machine desirably is equipped with a mold de-gassing arrangement which entails means for raising or separating the platens momentarily to permit the escape of gas from the mold cavities. This operation is accomplished by a novel switch actuator and circuit arrangement disclosed herein, which can be readily by-passed by the user of the machine in the event the de-gassing operation is not required. In still other applications of the molding machine, the aforementioned transfer means introduce powdered molding material directly into transfer molding pot or cavity means where the powder is compressed, heated, and forced as it melts into the molding dies or cavities.

These and other objects, features and advantages of the invention will be elaborated upon during the forthcoming description of certain presently preferred embodiments of the invention together with certain presently preferred methods of practicing the same.

In the accompanying drawings there are shown presently preferred embodiments of the invention together with preferred methods of practicing the same wherein:

FIGURE 5 is an enlarged, top plan view, partially in section, view of the metering means illustrated in FIGURE 2 of the drawings and taken along reference line V—V thereof;

FIGURE 6 is an enlarged, partial view of the metering means shown in FIGURE 5 and taken along reference line VI—VI thereof;

FIGURE 7 is an enlarged, partial elevational view of the de-gassing control mechanism as illustrated in FIGURE 1 of the drawings;

FIGURE 8 is a partial, top plan view of the apparatus as shown in FIGURE 7 and taken generally along reference line VIII—VIII of FIGURE 7;

FIGURE 9 is an enlarged, partial, cross-sectional view of the apparatus shown in FIGURE 1 and taken along reference line IX—IX thereof;

FIGURE 10 is a schematic circuit diagram of one arrangement for operating the molding machine of the invention;

FIGURE 11 is a partial, elevational view of the apparatus generally as shown in FIGURE 4 with parts removed for clarity and illustrating alternative metering and transfer mechanism of the invention;

FIGURE 12 is a partial, vertically sectioned view of a molding machine similar to that shown in FIGURES 1 and 2 but arranged more particularly for transfer molding operations.

Figure 1:
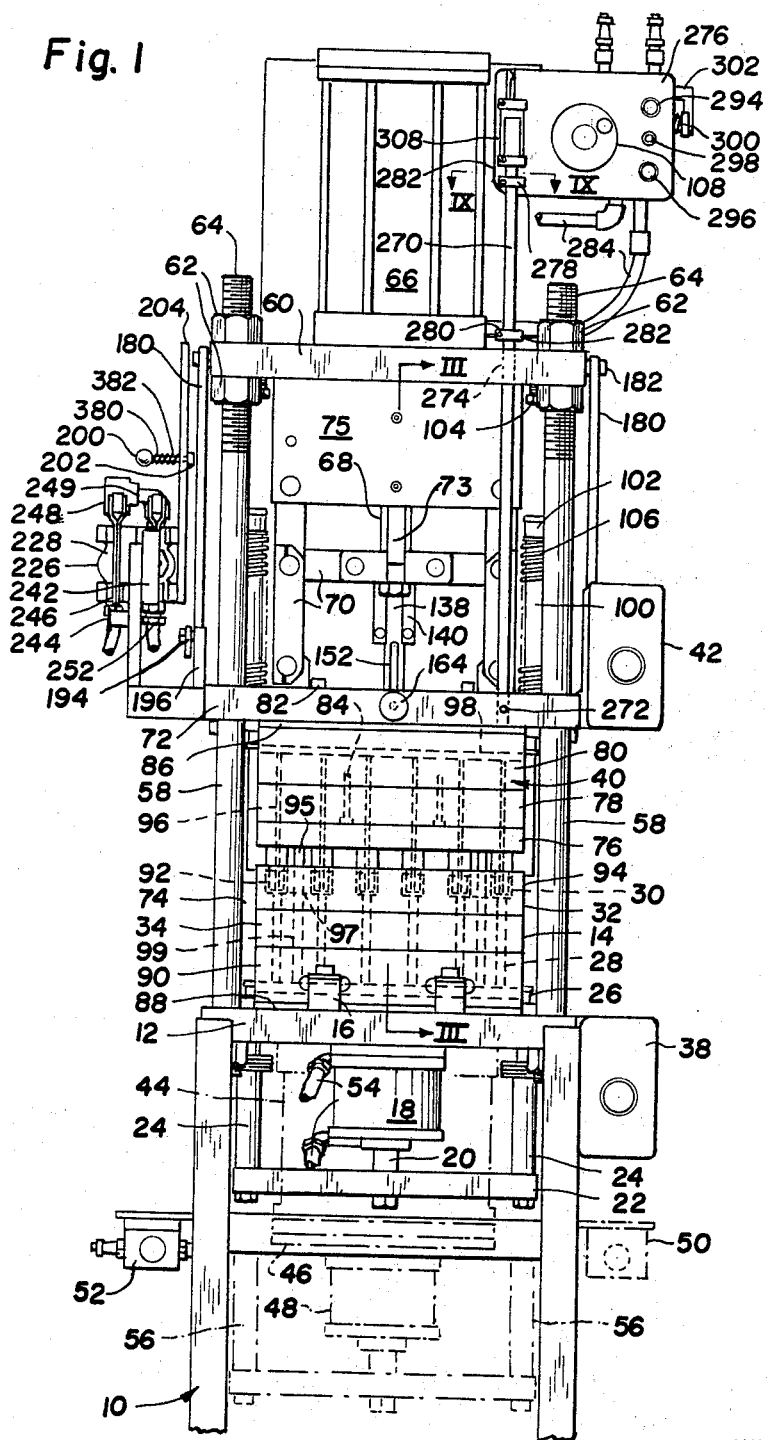
FIGURE 1 is a front elevational view of one arrangement of an automatic molding machine according to the invention, with the platens thereof shown in the closed position.
Figure 2:
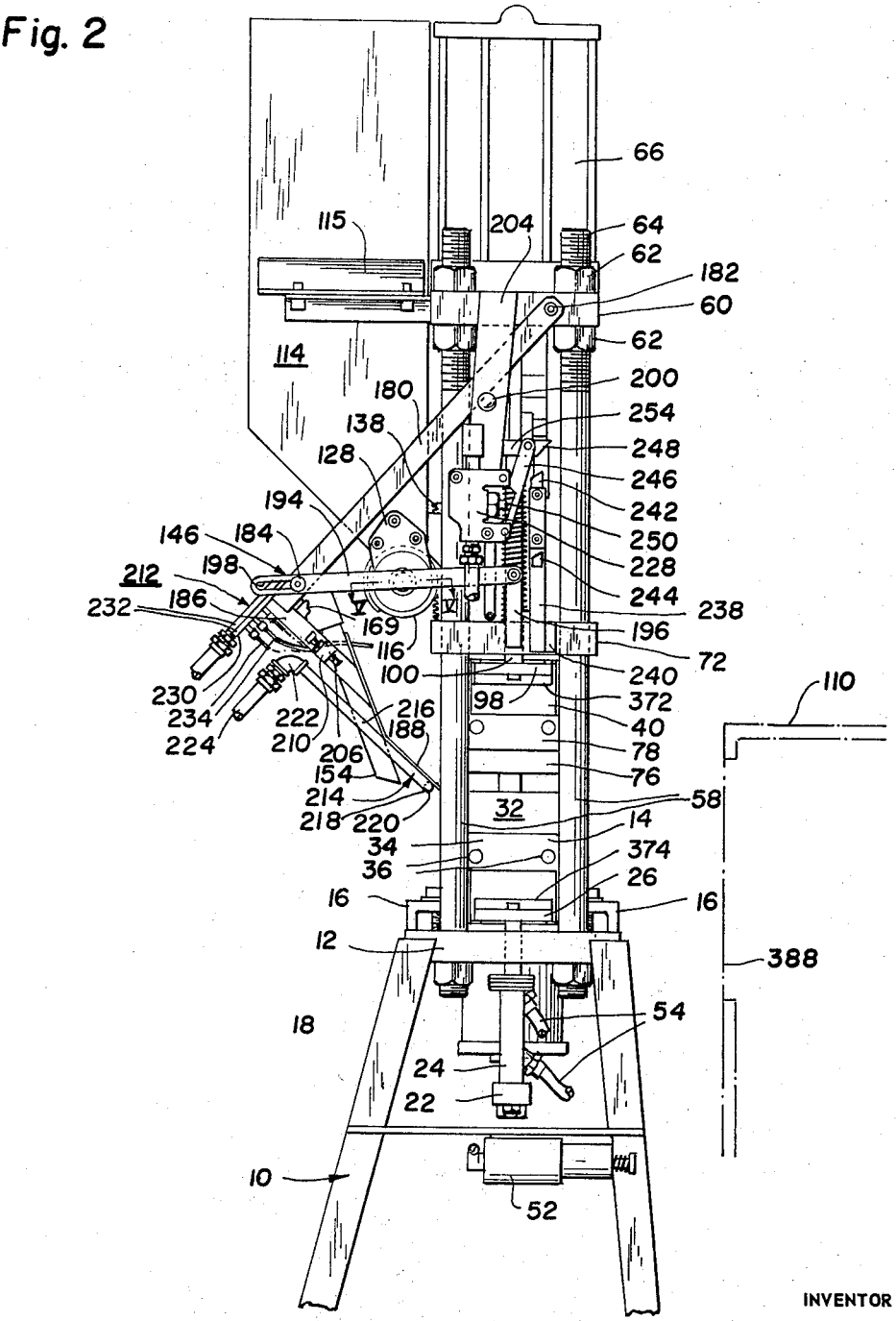
FIGURE 2 is a side elevational view of the molding machine illustrated in FIGURE 1.

Referring now more particularly to FIGURES 1 and 2 of the drawings, the exemplary form of the invention illustrated therein comprises a stand denoted generally by reference character 10 and terminating at its upper end (as viewed in FIGURES 1 and 2) in a lower or stationary platen 12. Supported on the lower platen 12 is a lower or fixed die assembly 14, which is secured to the upper surface of the stationary platen 12 by means of a number of mold clamps 16, with four such clamps being employed in this arrangement of the invention.

On the underside of the stationary platen 12 is secured an actuating cylinder 18, having a short-stroke, operating rod 20 coupled to crosspiece 22 which in turn is secured to a pair of standards 24 of a lift pin assembly denoted generally by reference character 26 and including lift pins 28 extending through closely fitting openings therefor to a point flush with the bottom surface of the mold cavities 30. As better shown in FIGURE 1, six such mold cavities are employed in this example of the invention, although it will be understood that a greater or lesser number can be employed. Moreover, although the mold cavities 30 are illustrated as lying along a single straight line across the lower die block assembly 14, it will be understood that the mold cavities can be arranged in two or more rows as noted with respect to FIGURE 11, or staggered or arranged otherwise in non-linear arrays (not shown). The die block 32 of the die assembly is mounted flushly upon the upper surface of a heater block 34 thereof in which a pair of heaters 36 are inserted through its longitudinal openings. An additional opening (not shown) is provided in the heater block 34 for insertion of a suitable temperature-sensing element (not shown) which in turn is coupled to thermostat 38. The upper die assembly 40 is similarly provided with heaters and temperature-sensing means which in turn are controlled by upper thermostat 42.

FIGURE 1 shows in addition the alternative provision of a transfer molding cylinder 44 as denoted by the dashed outlines thereof. In the latter arrangement the transfer cylinder 44 is secured to the underside of the lower platen 12, and the transfer cylinder is provided with an adaptor plate 46 on which is mounted the bottom lift cylinder as denoted by the dashed outline 48 thereof. When so provided the transfer cylinder is controlled by an actuting valve 50. A similar valve 52 is coupled to the bottom lift cylinder 18 through suitable fluid connections 54. When the bottom lift cylinder is mounted in its alternative arrangement, as denoted by its dashed outline 48, correspondingly longer lift standards 56 are employed in place of the standards 24 described above. Further details of the transfer cylinder arrangement and associated operating components are described hereinafter in connection with FIGURE 12 of the drawings.

Extending upward from their points of securance on the stationary platen 12 are a number of parallel rails or standards 58, which in this example are four in number. Adjacent the upper ends of the standards 58 a stationary platform 60 is adjustably mounted by means of nuts 62 and threaded end portions 64 of the standards 58. Mounted on the platform 60 is a cylinder 66, the operating rod 68 of which is coupled through a conventional toggle arrangement denoted generally by reference character 70 to an upper or movable platen 72. The platen 72 is provided with an equal number of sleeve-type bearings through which the standards 58 are individually inserted so that the movable platen 72 is slidably mounted thereon. A pair of toggle guide pins 73 are secured to toggle plate 75 (FIGURE 1) and serve also as stops for defining the upper limit of travel of the movable platen 72.

In FIGURES 1 and 2 of the drawings, the upper platen 72 is illustrated in its lowermost or closed portion, which defines the daylight or opening 74 to accommodate the upper and lower die assemblies 40, 14. The upper die assembly 40 is generally similar to the lower assembly 14 and includes a force plate 76 and a support plate or heater block 78. The upper die assembly 40 is secured to the underside of the movable platen 72 by means of a pair of spacer plates 80 and mounting bolts 82 and 84. Inserted between the movable platen 72 and the spacer plates 80 is a mold insulating member 86 for the purpose of minimizing heat loss from the heater block 78. A similar mold insulator 88 is clamped between the spacer plates 90 of the lower die assembly 14 and the upper surface of the stationary platen 12.

In this arrangement, the force plate 76 is provided with a plurality of shouldered force members 92 which cooperate with the aforementioned mold cavities 30 of cavity plate 94 forming part of the lower die assembly 14. The shoulder portions 91 of the forces are each provided in this example with diametrically opposed flat surfaces, one of which is shown at 93 (FIGURE 4) in order to permit excess molding material to leave the mold cavity 30 in the form of flashing, inasmuch as the shouldered portions 91 are inserted a short distance into the mold cavity to determine the upper extremity of the molded article 236. In this arrangement, each of the force members 92 are hollow to provide passage for ejector pins 96 therethrough. As better shown in FIGURE 1 of the drawings, the ejector pins 96 are secured to an ejector bar 98 which in turn is mounted adjacent its ends respectively on a pair of spring loaded actuating rods 100. As better shown in FIGURE 4 of the drawings, the ejector plate 98 is moved downwardly carrying with it the ejector pins 96 when the top or bumper portions 102 of the actuating rods 100 engage adjustable stops 104 secured to the underside of the fixed support plate 60 and positioned in alignment respectively with the actuator rods 100. In this arrangement, the stops 104 can take the form of a machine screw which is adjustably threaded into tapped apertures therefor in the supporting plate 60. This action occurs, of course, near the top of the reciprocational path of the movable platen 72. When the latter is again lowered, coil springs 106 cause the ejector pins 96 to be withdrawn as their bumpers 102 leave the stops 104.

However, when the upper or movable platen 72 is first moved from its closed position the bottom lift cylinder 18 is actuated by timer mechanism 108 which is coupled to control valve 52 of the cylinder through suitable circuitry (not shown) to raise the lower lifter bar 22 and with it the bottom ejector assembly 26 and including the lift pins 28 to aid in parting the molded articles from the cavity block 94. As a result, the molded articles cling to the forces 92 from which they are ejected adjacent the upper limit of travel of the movable platen 72 by actuation of the ejector pins 96 as just described. At the latter position of the movable platen 72, the molded articles are blown into a suitable storage bin 110 as better shown in FIGURE 2 of the drawings by suitably directed air streams. An arrangement of the invention for producing such air streams is fully described hereinafter.

At each end of the row of shouldered forces 92 a leader pin 95 is secured to the force block 76 and is arranged for insertion into an aligned cavity 97 therefor in the cavity block 94 of the lower die assembly 14. When thus inserted, at the closed position of the platens 72 and 12, the leader pins 95 respectively engage a pair of rods 99 which also are reciprocatable within the leader pin cavities. The rods 99 are secured to the lower lift pin plate 26 and when thus engaged with the leader pins 95 prevent inadvertent operation of the lift pin assembly before the platens 72 and 12 are separated to eliminate any possibility of damage to the molded articles before the latter have permanently set or hardened within the mold cavities 30.

*Molding powder metering and transfer mechanism*

With more particular reference now to FIGURES 2–4 of the drawings, an arrangement of the invention for measuring and supplying appropriate charges of molding powder from a bin or container 114 therefor to the individual cavities 30 of the mold block 94 will now be described. As better shown in FIGURE 2, the bin 114 is mounted on the upper suport plate 60 by a pair of bracket assemblies 115 secured respectively to the sides of the bin 114 and to the adjacent edge of the fixed support plate 60.

The metering means of the invention includes a feed spindle 116, the length of which is generally co-extensive with the width of the storage bin 114 and is mounted for rotation in the lower or feed opening 118 of the bin 114. The outlet opening 118 of the bin is substantially closed by a generally cylindrical housing 120 for the feed spindle 116, which housing is provided with a plurality of feed openings 122 as better shown in FIGURES 3 and 4 of the drawings.

Figure 3:
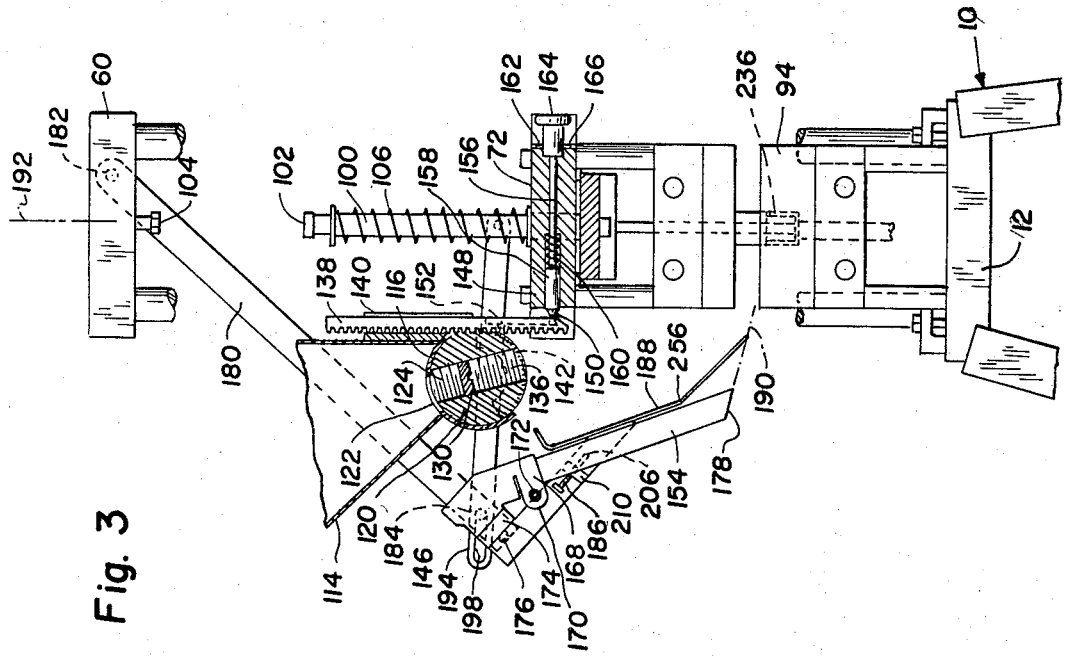
FIGURE 3 is an enlarged, partial, vertically sectioned view of the apparatus shown in FIGURE 1 and taken along reference line III—III thereof.

When the feed spindle 116 is rotated to its powder loading position as shown in FIGURE 3, by means presently to be described, the adjustable powder compartments 124 are substantially aligned with the feed openings 122 in the cylindrical spindle housing 120. As shown in FIGURE 3, such alignment occurs adjacent the closed position of the molding machine platens 72 and 12. At this position of the spindle 116 the powder compartments thereof are filled with charges of molding powder passing through the spindle housing openings 122. It will be understood, of course, that the number of spindle compartments 124 will be equivalent to the number of mold cavities 30 and can be varied in number therewith as set forth above.

As better shown in FIGURE 5, the feed spindle 116 terminates at its ends respectively in a pair of stub shafts 126 whereby the spindle is rotatably mounted in close fitting engagement with its housing 120 by means of a pair of supporting and bearing plates 128, which are secured to each side of the feed bin 114 adjacent its lower opening 118 as better shown in FIGURE 2 of the drawings. The close fitting engagement of the feed spindle 116 with the housing 120 is necessary to prevent escape of the molding powder from the bin 114 other than through delivery into the powder compartments 124 of the spindle.

As evident from FIGURE 3 of the drawings, each powder compartment 124 extends transversely through the feed spindle 116 but is adjustably closed by means of a threaded slug 130. In accordance with the invention, the slug 130 provides a convenient means for adjusting the volume of each powder compartment 124. In furtherance of this purpose, each powder compartment 124 in this arrangement is of generally circular configuration as better shown in FIGURES 5 and 6 of the drawings and is provided along its length with an internal, truncated thread as denoted by reference character 132. The threaded slug 130, the thread of which is, of course, of normal configuration, therefore threadedly engages the thread 132 at any desired position of the threaded slug 130 along the length of the associated powder compartment 124. The flattened lands of the thread are provided in this arrangement in order to minimize interference of the thread 132 with the flow of molding powder into and out of the powder compartments 124. To provide convenient adjustment of the threaded slugs 130 the latter are each provided with a screw driver slot 134 or the like for rotation of the slug to a selected position along the length of the feed compartments 124. The volumes of the feed compartments therefore can be individually adjusted by means of a screw driver or other suitable tool inserted through the adjacent opening 136 of each powder compartment 124. As the feed spindle 116 is rotated for loading and dumping purposes of its powder compartments 124, by means presently to be described, the adjustment ends 136 of the feed compartments, in this example, are never exposed to the spindle housing openings 122, as better shown by the position of the feed spindle 116 in FIGURE 4 of the drawings.

In order to ensure a properly timed filling and emptying of the feed spindle 116 during each cyclic operation of the molding machine, novel mechanism is provided for inducing rotation of the feed spindle 116 by movements of the upper or movable platen 72. By tying rotation of the feed spindle 116 to movements of the platen 72, the chances of malfunctioning of the metering means are virtually eliminated, and the structure of the machine is considerably simplified in that programmed or otherwise remotely controlled actuating means for the feed spindle are eliminated.

Figure 4:
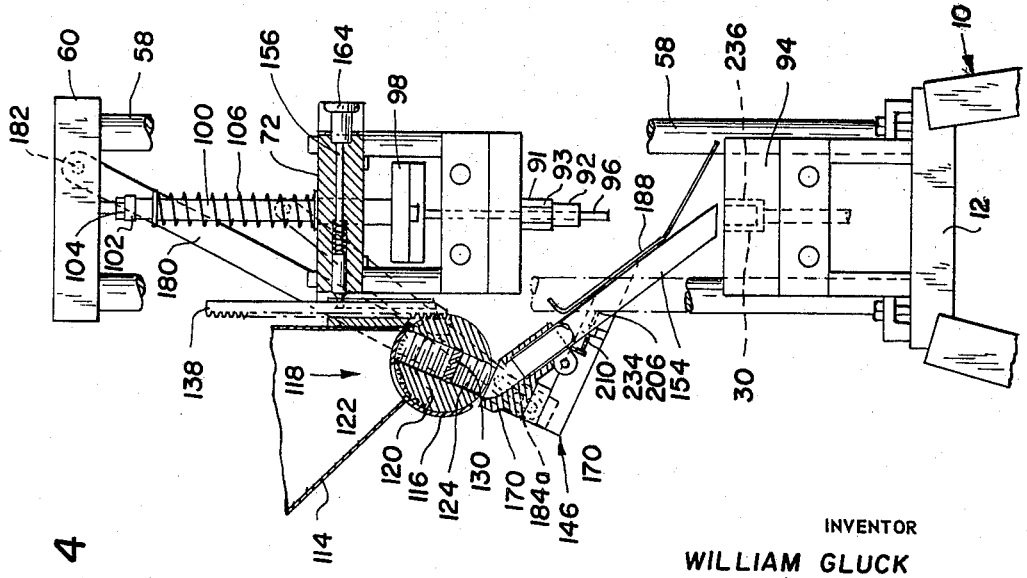
FIGURE 4 is a similarly enlarged and sectioned view of the apparatus as shown in FIGURE 3 but illustrating the machine in the opened position of its platens.
Figure 13:
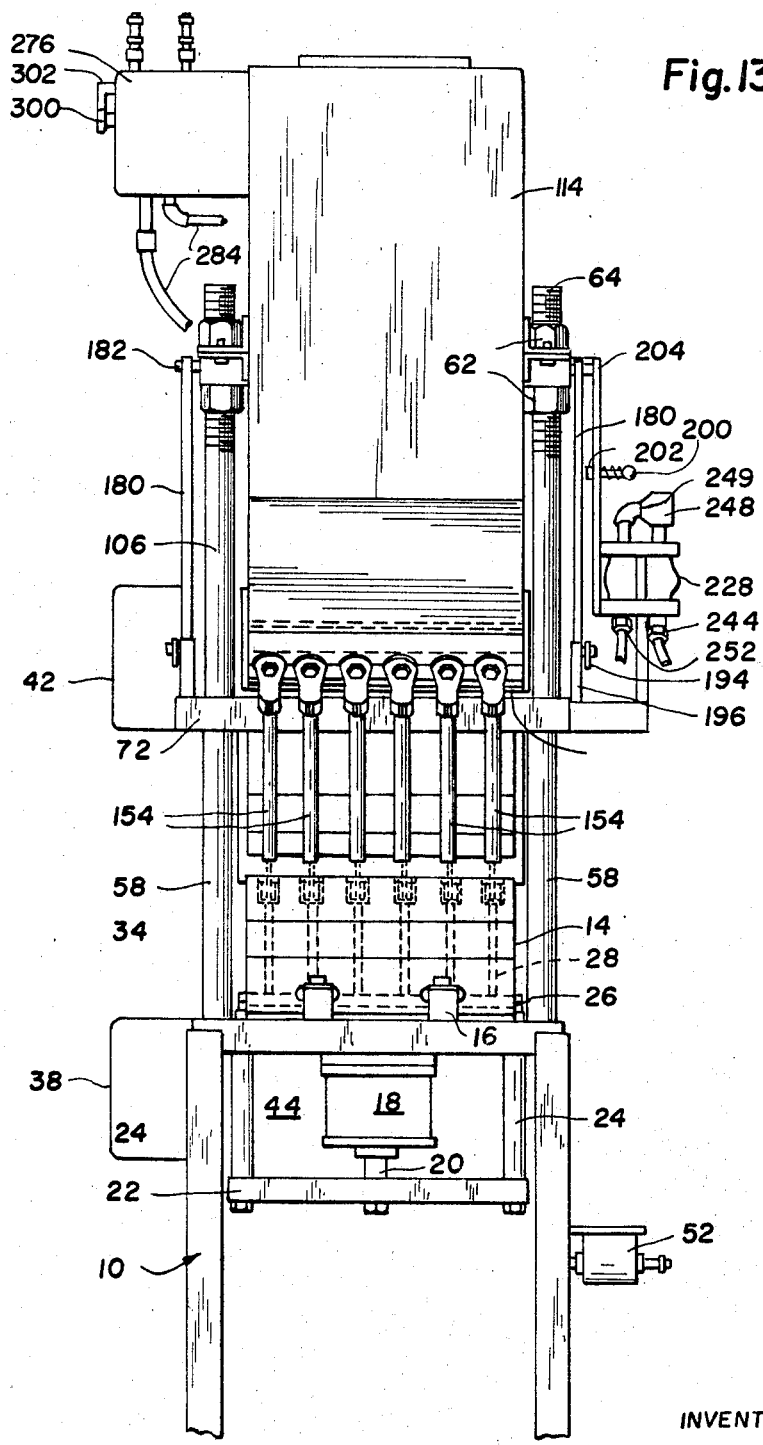
FIGURE 13 is a partial, rear elevational view of the molding machine as shown in FIGURES 1 and 2 and taken generally along reference line XIII—XIII of FIGURE 2.

One arrangement for so actuating the feed spindle in accordance with this feature of the invention includes the provision of a slidably mounted rack 138 which is mounted on a suitably shaped guide block 140 which in turn is secured to the adjacent surface of the feed bin 114, as better shown in FIGURES 3 and 4 of the drawings. The rack 138 is thus mounted for vertically sliding movement as viewed in FIGURES 3 and 4 and the gear teeth thereof extend toward the feed spindle 116 for cooperation with a gearing segment 142. In this example, the gearing segment is of generally circular configuration and desirably is located in the central area of the feed spindle 116 which is provided with a circumferential groove 144, as better shown in FIGURE 5 of the drawings, for receiving the gearing segment. The feed spindle, as better shown in FIGURE 5, is provided in addition with a number of shallow grooves or journals 145 extending circumferentially between the feed compartments 124 in order to reduce friction between the cylindrical spindle housing 120 and the spindle as the latter is rotated.

The feed spindle 116 is therefore rotated by enmeshment of the gearing segment 142 with the slidably mounted rack 138 through an angular displacement defined by the location of spindle housing openings 122 and the location of the movable transfer mechanism 146 at the cavity filling position of the latter, as illustrated in FIGURE 4 of the drawings. Such angular displacement of the feed spindle 116 is effected by raising and lowering of the movable platen 72 between its open and closed positions. As the movable platen 72 is raised and lowered, the rack 138 is similarly pushed upwardly by engagement of a feed actuating plunger 148 with the rack 138 to rotate the feed spindle 116 to its unloading or dumping position as shown in FIGURE 4. When the upper platen 72 is again lowered the feed actuating plunger 148 pulls the rack 138 downward to return the feed spindle 116 to its loading position as shown in FIGURE 3 of the drawings.

The operating end 150 of the feed plunger 148 actuates the rack 138 by engagement with the ends of a lost-motion groove 152 provided in the rack 138 and extended longitudinally thereof adjacent its lower portion. The purpose of the lost-motion groove 152 is to coordinate the amount of required angular displacement of the feed spindle 116 and the length of travel of the movable platen 72. The length of the lost-motion slot 152 therefor will be determined by the radius of curvature of the gear segment 142 and the respective positions of the bin powder delivery openings 122 and the upper ends of the transfer chutes 154 described below in the cavity loading position of the transfer mechanism 146. The lost-motion groove 152 also serves to prevent actuation of the metering means, including rotation of the feed spindle 116 during the de-gassing portion of the molding cycle described below, when the upper platen 72 is raised a short distance to permit gas to escape from the articles being molded in the cavities 30.

In the event of malfunction of the machine or for purposes of set-up or maintenance or the like, the metering means, including rotation of the feed spindle 116, can be effectively and quickly terminated by means associated with the feed plunger 148. In furtherance of this purpose the feed actuator 148 includes a rod 156 extending transversely through the movable platen 72 in a suitable opening therefor. The rod 156 includes enlarged or shouldered portion 158 adjacent its end 150 for the purpose of confining a compressed biasing spring 160 within an enlarged portion of the aforementioned rod opening. The spring 160, therefore, biases the end 150 of the plunger into the engagement within the lost-motion groove 152 of the rack 138. When thus engaged, a transverse pin 162 mounted in an operating knob 164 of the plunger rod 156 is seated in a vertical groove 166 extending across the front edge of the movable platen 72 at the aforementioned rod opening therein, as better shown in FIGURE 1 of the drawings. Therefore, by pulling the operating knob 164 outward and turning the knob to misalign the transverse pin 162 relative to the groove 166, the end 150 of the plunger rod 156 is held out of the lost-motion slot 152 in a position of disengagement from the rack 138. The rack 138 then is no longer actuated by movements of the platen 72. The operating knob 164 of the feed actuating plunger 148 is readily accessible from the front of the molding machine as shown in FIGURE 1 so that the metering mechanism can be quickly de-activated in case of an emergency.

*The molding power transfer mechanism*

The transfer mechanism 146, which has been alluded to generally above, is arranged in accordance with another feature of the invention for conveying charges of molding powder from the unloading position of the feed spindle as shown in FIGURE 4 of the drawings to the entrances respectively of the aforementioned mold cavities 30. The transfer mechanism 146 includes a number of generally tubular chutes 154 as better shown in FIGURES 1-4 and 13 which are of course equivalent to the number of mold cavities 30. Each of the chutes 154 is clamped at its upper end in a fitting 168 which is provided with an upper opening 170, disposed in alignment with the opening of the associated feed compartment 124 at the powder discharge position of the feed spindle 116 as better shown in FIGURE 4. Each chute 154 is clamped in its associated fitting 168 by means of a partially encircling leaf spring 170 and set screw 172, and the fittings 168 are mounted upon a supporting bar 174 by means of machine screws 176. The openings at the lower ends of the chutes 154 are beveled as denoted by reference character 178 so that the openings 178 are generally parallel to the top surface of the cavity block 94 when the chutes are inserted between the platens 72 and 12 by means presently to be described.

When so positioned, as shown in FIGURE 4, the charges of molding powder are discharged by gravity from the powder compartments 124 of the feed spindle 116 and continue to fall by gravity through the apertured clamp fittings 168 and the chutes 154 to the cavities 30. In those molding operations where the cavities 30 are of differing sizes, the threaded slugs 130 of the feed compartments 124 can be differently adjusted to provide volumetrically differing charges of molding powder.

One arrangement for inserting and withdrawing the transfer mechanism 146 relative to its cavity filling position between the platens 72 and 12 includes in this example the provision of a pair of pivoted swing arms 180 which are pivotally connected adjacent their upper ends to the end edges of the upper support plate 60, as denoted by reference character 182. At their lower ends the pivoted arms are rigidly joined to the ends of the clamp fitting supporting bar 174 by welding or the like, and a pair of crossbraces 186 are secured at their ends respectively to the supporting bar 174 and to a baffle or shield 188 described below.

The entire assembly of transfer chutes 154 together with their clamp fittings 168 are thus arranged for pivotal or swinging movement through an arc as described and denoted by chain line 190 (FIGURE 3). As better shown in that figure and also in FIGURES 2 and 4, the pivot point of the swing arms 180 is positioned at or preferably forwardly of a vertically central plane 192 of the machine, on which the cavities 30 lie, so that the discharge ends of the chutes 154 prescribed a downward arc 190 throughout their path of travel from the closed position of the platens 72 and 12 as shown in FIGURE 3 of the drawings to the cavity loading position of the transfer mechanism as shown in FIGURE 4. By arranging the transfer mechanism 146 to swing through a downward arc 190 the transfer mechanism can be permitted to swing downwardly and inwardly to the cavity loading position by gravity, in a manner described more fully below. This arrangement represents a very important safety factor in that inward movement of the transfer mechanism is readily halted by the inadvertent presence of some obstruction. This arrangement also obviates any possibility of damage to the transfer mechanism by collision with molded articles not completely removed from the mold cavity 30 or by any other obstruction which may be unintentionally present in the path of the transfer mechanism. Finally, the use of gravity operation of the transfer mechanism as described permits the beveled discharge ends 178 of the chutes to be positioned very closely adjacent the openings of the mold cavities 30.

The outward and upward movements of the transfer mechanism, however, are linked directly to the vertical reciprocating movement of the upper platen 72. This arrangement greatly simplifies the actuating means of the transfer mechanism and avoids the use of complicated programming arrangement which would be required by remotely actuated means. More particularly, this arrangement ensures that the transfer mechanism is always retracted when the upper platen descends.

One arrangement for thus operating the transfer mechanism includes the provision of a pair of pivoted link members 194 which are pivotally connected to associated standards 196 which in turn are rigidly secured to the ends respectively of the movable platen 72. The other ends of the link members 194 desirably are bifurcated or otherwise shaped to define lost-motion slots 198 in their associated end portions. The protruding portions of which secure the link members stripper bolts 184, to the swing arm 180, are slidably engaged in the lost-motion slots 198. Accordingly, as the movable platen 72 descends from a point adjacently below its open position (FIGURE 4) to its closed position (FIGURE 2) engagement of the stripper bolts 184 with the inward ends of the lost-motion slots 198 pushes the swing arms 180 of the transfer mechanism outwardly and upwardly to the inactive position thereof so that the transfer mechanism 146 does not interfere with closing of the platens 72 and 12 and the die assemblies 14 and 40 secured thereto.

The transfer mechanism can be de-activated or retained in this retracted position by depressing a spring loaded swing withholding plunger 200 inwardly to a position such that its inner, headed end 202 is engaged under the adjacent edge of the associated swing arm 180. As better shown in FIGURES 1 and 2, the plunger 200 is mounted in a suitable aperture therefor extending through a valve supporting bracket 204, described below, which is rigidly secured to the upper supporting plate 60. Use of the swing withholding plunger 200 to de-activate the transfer mechanism 146, although not essential to the operation of the invention, is desirable to facilitate machine maintenance, die assembly changing, etc. When the transfer mechanism 146 is thus de-activated, the lost-motion slots 198 of the link members 194 are of sufficient length that the link members can be pivoted to their positions as shown in FIGURE 4 (at the upper limit of travel of the movable platen 72) without disengaging the lost-motion slots 198 from the stripper bolts 184.

During normal operation of the molding machine, when the withholding plunger 200 is released, raising of the upper platen 72 permits the transfer mechanism to move inwardly and downwardly along the arc 190 to its powder discharging position. During this operation downward movement of the transfer mechanism is controlled or tied to upward movement of the movable platen 72 by engagement of the stripper bolts 184, under the influence of gravity, against the inward extremities of the lost-motion slots 198 of the link members 194. On the other hand, such gravity operation and the length of the lost-motion slots 198 permits the movable platen to continue upward without applying inwardly directed forces to the transfer mechanism in the event that the latter should be confronted with the presence of some obstruction.

At the inward limit of transfer mechanism travel, as shown in FIGURE 4, an adjustable stop 206 mounted on one or both crossbraces 186 is positioned to engage the associated guidepost 58 as better shown in FIGURE 1 of the drawings. In this example, the adjustable stop 206 can take the form of a machine bolt and lock nut threaded relatively to a suitable bracket 210 which is welded or otherwise secured to the side surface of the crossbrace 186. At the engaged position of the stop 206 (FIGURE 4) the lost motion slots 198 of the link members 194 permit the transfer mechanism 146 to remain stationary at its inmost position, while the platen 72 continues its upper movement and rotates the feed spindle 116 to its dumping position. The length of the slots 198 allows adequate time for power to flow down the chutes 154 while the platen begins its descent.

In this example, the chutes 154 are illustrated in a generally linear array to correspond with the similar array of mold cavities 30 and forces 92. It will be understood, of course, that some or all of the chutes 154 can be bent or otherwise positioned such that their beveled discharge openings 178 are staggered or otherwise disposed as required by a given non-linear array of mol cavities. Each chute and its fitting can be adjusted laterally (or longitudinally of a linear array of cavities) by loosening the single mounting screw 176 and pivoting the fitting on the support 174. The screw 176 is positioned, however, such that the upper opening of the fitting passage 170 remains aligned with the dump position of the associated feed spindle compartment 124. It will also be appreciated that a greater or lesser number of chutes 154 can be provided rather than the number shown, as dictated by the number of mold cavities of a given pair of die assemblies.

*The air ejection and mold sweep mechanism*

In this arrangement of the invention, the air ejector means denoted generally by reference character 212 and air sweep means 214 are mounted on the transfer mechanism 146 for movement therewith into their respective operating positions as the upper platen 72 is raised or withdrawn. The air ejector means and the air sweep means are therefore positioned by the transfer mechanism 146 and by actuation of the upper platen 72. This arrangement, of course, eliminates the number of required mechanical linkages between the air sweep means and the air ejector means and the other structural components of the machine. Also eliminated are the independent actuators for stationary or other conventional devices which either are programmed automatically or operated manually by an attendant.

Specifically, the air ejector means 212 and the air sweep means 214 are mounted upon the aforementioned baffle 188 and secured to the underside thereof as by weldends of the crossbraces 186. In furtherance of this purpose, the air sweep means 214, as better shown in FIGURE 13, includes a bent segment of relatively rigid tubing 216 having a nozzle section 218 with jet openings 220 extending along the lower or leading edge of the baffle 188 and secured to the undeside thereof as by welding or the like. An entry run of the air sweep tubing 216 extends generally rearwardly and upwardly to a fitting 222 to which is secured a flexible hose 224. The other end of the hose is secured to spring a loaded stop valve 226, which is secured together with similar stop valve 228 to the aforementioned depending valve bracket 204, as better shown in FIGURES 1 and 2.

The sequential operation of the stop valves 226 and 228 in this example of the invention will be described hereinafter. For the present, it can be noted that the air sweep valve 226 is actuated for a relatively longer period of time so that the air sweep jets 220 are actuated throughout a substantial portion of the path of the transfer mechanism 146 as the latter is pivoted toward the mold cavities 30. Desirably, the jet openings 220, or at least some of them, are aligned with the mold cavities 30 and directed downwardly of the nozzle section 218 so as to blow directly into the mold cavities 30 as they pass thereover.

The air ejector means 212 in this example includes an outlet manifold 230 which is secured to the crossbrace 174 of the transfer mechanism and suitable fittings 232 are threaded to the tapped apertures thereof for securing a number of jet tubes 234 to the manifold 230 in communication therewith. The jet tubes 234 are supported adjacent their other ends by insertion through suitable apertures respectively extending along the outer, upper edge of the baffle 188, as better shown in FIGURE 13. In this example, the jet tubes 234 preferably are fabricated from a relatively flexible tubing, fabricated for example from annealed, drawn copper, so that their outer ends can be readily bent to direct blasts of air individually onto the shouldered forces 92 at the uppermost position of the movable platen 72, when the ejector pins 96 are extended therethrough, to convey the molded articles to the storage bin 110 by blasts of air, as denoted by the position of articles 236. The jet tubes 234 are about the same in length owing to the in-line array of cavities 30. In those applications wherein the cavities are for example arranged in rows or staggered it will be understood that some of the jet tubes 234 can be made longer, as shown in FIGURE 11.

One arrangement for controlling and sequencing the operation of the air sweep means 214 and the air ejector means 212 involves a relatively simple mechanical linkage for tying the operation of the associated air valves 226 and 228 to the reciprocating movements of the upper platen 72. Accordingly, remotely actuated valve means such as air or electric solenoid valves and the use of related programming or other control circuitry are avoided. One arrangement for so actuating the valves 226 and 228 includes a cam mounting post or standard 238, the lower end of which is rigidly secured to a laterally and outwardly extending bracket 240 secured in turn to the adjacent end of the movable platen 72.

The cam standard 238 has a pair of laterally offset cam members 242 and 244 located at differing elevations thereon. The cams 242 and 244 respectively cooperate with a pair of valve actuating arms 246 pivotally secured at one end thereof to their associated valve body structures, the other end of which arms have rotatably secured thereto in limited pivotability cooperating cam members 248 and 249 which are positioned in the paths of movement respectively of the actuating cams 242 and 244. When moved toward its valve operating position each valve arm 246 engages a valve button 250 which is internally connected to suitable spring-loaded or otherwise biased valve mechanism (not shown) within the valve 226 or 228 to open the valve.

As seen from FIGURES 1 and 2, the cam 242 is disposed to open the air sweep valve 226 and to energize the air sweep means 214 shortly after the upper platen begins its upward movement under impetus of operating cylinder 66. However, before the upper platen reaches its upper limit of travel the lower end 252 of the sweep valve actuating cam 242 passes the operating arm cam 249, thereby terminating the air sweep before the transfer mechanism 146 begins its return swing so that the air sweep does not blow the deposited mold powder of the mold cavity 30. The cam member 249 of the air sweep valve 226 is provided with shouldered stop portion 254 to lend a limited pivotal movement to the cam member 249 so that as the upper platen 72 returns to its closed position the actuating arm cam 249 is pivoted out of the way of the descending cam 242. Thereafter, the cam member 249 pivotally returns to its position as shown in FIGURE 2 by gravity.

It will be seen from FIGURE 4 that the baffle or shield 188 is interposed between the molded articles and the lower cavity block 94 when the molded articles 236 are blown into the hopper 110 by the air blasts. In furtherance of this purpose the baffle plate 188 is bent as denoted by reference character 256 so that the plate provides the desired coverage of the cavity block 94 without extending below the arcuate path 190 of the transfer tube. With this arrangement, then, any particles of flashing removed from the articles 236 by the operation of the ejector pins 96 or the air blasts from the jet tubes 234 is prevented from falling on the otherwise exposed surface of the cavity block 94 and particularly into the mold cavities 30 thereof. The shield or baffle plate 188 is, of course, inserted and removed relative to the opening between the platens 72 and 12 by operation of the transfer mechanism 146 so as to minimize the number of mechanical linkages required to operate the automatic accessories of the molding machine.

The movable platen travel control and de-gassing mechanisms

With reference now to FIGURES 1 and 7–9 and to the circuit diagram of FIGURE 10, an exemplary arrangement is shown for controlling the travel of the upper platen during its normal reciprocating movements between the aforementioned closed and open positions thereof and for actuating the platen to produce a limited reciprocatory movement for mold degassing operations without, however, actuating the air valves 226 and 228 or the metering and transfer mechanism.

The control mechanism of the invention includes a switch actuator rod 270 which is secured at its lower end to the upper or movable platen 72 by means of a set screw 272 extending into a suitable aperture receiving the end of the actuator rod 270. The rod 270 protrudes through an aligned aperture 274 in the stationary supporting plate 60 which thereby affords guiding lateral support to the actuator rod 270 during vertical movement thereof. Mounted on a control box 276 is a two-way switch 278, which is positioned for cooperation with a pair of spaced switch actuators 280, each having a switch engaging leaf spring 282. The spaced positions of the switch actuators 280 on the actuator rod 270 with respect to the limit switch 278 determine the upper and lower limits of movement of the upper platen 72 by suitably controlling a conventional spring return solenoid valve (not shown) mounted within the control box 276, to which are connected pneumatic leads 284 for the actuating cylinder 66.

As better shown in FIGURE 10, which illustrates a control circuit of the invention with the various switch means thereof actuated as in the platen-closed, cure portion of the molding machine cycle. At this point in the molding machine operation contacts 288 of limit switch 278 are closed (by upper spring contact 282) and timer 108 is energized. At the end of the curing cycle, the preset timer 108 stops and simultaneously energizes solenoid coil 290 which raises the upper platen 72 to its extreme upper position where the lower leaf spring 282 actuates limit switch 278 to open contacts 288 and re-set the timer mechanism 108 which in turn de-energizes solenoid coil 290 causing the aforementioned spring return solenoid valve to energize the upper cylinder 66 to lower the upper platen 72 into platen-closed position, which closes contacts 288 by the upper leaf spring 282, energizes timer 108, and starts a succeeding cycle. Pilot lamp 296 indicates that the machine circuit is turned on by proper actuation of on-off switch 298. The other pilot lamp 294 serves as a warning means and is energized when contacts 292 of limit switch 278 are closed as upper platen 72 reaches its extreme upper position and remains energized if platen 72 does not thereafter fully, for example due to excess powder in one or more of the cavities, close and automatic operation of the machine is interrupted. Thus the timer 108 is not again energized to commence a succeeding molding cycle until the limit switch is actuated by the upper spring contact 280.

The upper platen 72 can be raised and lowered manually by depressing manual valve operator 300, which bypasses the solenoid operator of the actuating cylinder valve. As long as valve operator 300 is depressed the upper platen 72 remains in its extreme open position. When the valve operator 300 is released the upper platen is returned to its mold closing position. A pivoted valve lock 302 also mounted on the control box 276 can be swung over the manual operator 300 when the latter is in its depressed position to retain the movable platen at its upper limit of travel for an indefinite period.

A second two-way circuit switch 304 is included in the operating circuit of FIGURE 10 for control of an optional de-gassing arrangement of the invention. The switch 304 is likewise mounted on the front panel of the control box 276. When the switch 304 is actuated to close its pair of contacts 306, as denoted by the dashed outline of the corresponding switch actuator, the upper platen 72 is raised a short distance until de-gassing switch actuator 308 positioned on the switch actuator rod 270 actuates the switch 304 to close again its other pair of contacts 310, thereby lowering the upper platen again to its mold compressing position. At the same time solenoid 312 of the control valve 52 for the bottom lift cylinder remains unaffected but is thereafter energized simultaneously with solenoid coil 290 at the end of cure cycle only, through timer 108 as described earlier.

In this arrangement of the invention the de-gassing switch actuator 308 is provided with a pair of opposed, elevationally displaced leaf spring switch actuators 316 and 318. The switch actuator 308 is rotatably mounted on the switch actuator rod 270 by means of a pair of closely spaced collars 320 which are adjustably secured to the rod 270 by means of their set screws 322. Means are provided for imparting a relatively small angular displacement to the rotatable switch actuator 308 relative to rod 270 to bring its switch actuator spring 316 into engagement with operator 324 of the de-gassing switch 304 during downward movement of the switch actuator 308 and rod 270. Such angular displacing means on the other hand brings the other spring contact 318 of the actuator 308 into contact with switch operator 324 during upward movement of the switch actuator 308 in order to terminate the de-gassing operation and to return the upper platen to its mold-compressing position.

As better shown in FIGURES 7 and 8, one arrangement for so imparting limited angular displacement of the switch actuator 308 includes the provision of a camming spring 326 mounted in cam spring housing 328 which is positioned generally in the path of movement of the switch actuator 308 and rod 270. As viewed in FIGURE 7 of the drawings the spring housing 328 is provided with a first cam surface 330 adjacent its upper end and the surface 330 is positioned to engage a guide or steering pin 332 of the switch actuator 308 to the right, as viewed in the drawings, so that it moves downwardly along the right hand side of the camming spring 326 during downward movement of the actuator 308. This arrangement of the camming surface 330 and the spring 326 defines the associated limit of angular displacement of the switch actuator 308 whereat its left switch actuator spring 316 operatively engages the switch 304 as better shown in FIGURE 8 of the drawings.

Toward its actuating position relative to the switch 304, as shown in FIGURE 8, the switch actuator 308 continues its path downwardly of the spring housing 328 and the steering pin 332 thereof engages a camming surface 334 of the cam spring 326 causing the latter to move to the left as viewed in FIGURE 7 of the drawings to permit passage of the pin 332 and to engage detent 335 in groove 337 on the upper end of the actuator 308. The detent 335 is mounted in an aperture in the upper collar 320 and can be a spring loaded ball detent of conventional construction. At the position shown in FIGURE 7, spring contact 316 has engaged the switch operator 324 to actuate the de-gassing switch 304 and pin 332 has cleared the lower end of the spring 326 after which the spring snaps back into the position shown by the solid outline thereof in FIGURE 7. Thereafter, as the switch actuator 308 is moved upwardly by de-gassing movement of the upper platen 72, its steering pin 332 engages an opposing cam surface 336 of the cam spring 326 which angularly displaces the switch actuator 308 so that its pin 332 moves up the left side of the cam spring 326 and spring contact 318 actuates the de-gassing switch 304 to its platen closing position. The thickness of the cam spring determines the limits of angular displacement of the switch actuator 308.

At the end of the curing position of the cycle, the switch actuator 308 is again moved upwardly until its steering pin 332 engages a second cam surface 338 of the spring housing 328 whereby the switch actuator 308 is again angularly displaced to the right side of the cam spring 326 to re-engage the detent 335 in its groove 337 (FIGURE 8). The cam spring 326 is bent rearwardly as viewed in FIGURES 7 and 7a so that the resulting bend 340 as better shown in FIGURE 7a affords the necessary clearance to the steering pin 332 as it is cammed to the right. The switch actuator 308 is now ready for the de-gassing operation in the succeeding mold cycle of the machine.

The de-gassing mechanism can be readily de-activated simply by rotating the switch actuator 308 approximately a half turn when its steering pin is disposed to the right of the cam spring 326. When so positioned, its switch actuating springs 316 and 318 and its steering pin 332 are directed away from the de-gassing switch 304 and the cam spring 326 respectively so that the switch actuator 308 can no longer operate the de-gassing switch 304. At this position the detent 335 engages a diametrically opposite groove 341 on the adjacent end of the actuator 308 to retain the actuator in its inactive position.

*The transfer molding mechanism*

Referring now to FIGURE 12 of the drawings, one arrangement for adapting the molding machine of the invention for transfer molding is illustrated therein. In the transfer molding process, a powdered molding compound is transferred by suitable means into one of the die assemblies, 14' or 40'. For example, into a central transfer cavity or pot 346 formed in the lower die assembly 14'. Reciprocable within the cavity 346 is a closely fitted transfer plunger 348 which is connected at its lower end to operating rod 350 of the transfer cylinder 44 (FIGURE 1). The piston rod 350 operates through suitable apertures therefor in the lower or stationary platen 12' and in the bottom ejector plate 26'.

When the transfer ram 348 and piston rod 350 are withdrawn downwardly to their dashed outline positions, a metered charge of molding material is introduced into the transfer pot 346. The upper and lower plates are then closed to engage the upper and lower cavity blocks 76' and 94' of the die assemblies 40' and 14' respectively. When thus closed the transfer plunger 348 is moved upwardly to compress the powder and to force the molding material out of the transfer pot 346 as it melts and into the mold cavities 30'. In this arrangement of the invention, the upper cavity block 76' is provided with complementarily shaped cavities 352 which together with the lower cavities 30' define the molded articles 354. In this example, the upper cavity block 76' is further provided with a grooved configuration to define the cull 356, runners 358 and gates 360 of the molded assembly, in the conventional manner.

In the transfer molding process, a metered charge is deposited into the transfer pot 346 each time the upper platen is raised adjacent its uppermost position, as described above in connection with FIGURES 1–4. In many molding operations only a central one of the transfer tubes 154 need be used which can be pivoted or bent as required, or a new chute clamped in the related fitting 170, to align the lower end 178 thereof with the transfer pot 346. The volume of the associated spindle compartment 124 can be adjusted as required, and the remaining or unused bin outlets 122 can be sealed off, as with pressure-sensitive tape or other suitable means applied to the upper side of the spindle housing 120. Where the transfer charge requirements exceed the maximum capacity of the associated feed compartment 124, a spindle (not shown) having larger feed compartments can be substituted. Alternatively, depending upon the size of the pot opening 347, two or three or more of the chutes 154 can be pivoted toward one another to engage their ends 178, by manipulating their fitting screws 176. In furtherance of this purpose the ends 178 can be deformed to oval contours to permit closer positioning of the ends, or a branched conduit, such as a Y tube (not shown) with a single outlet opening can have its multiple inlet openings coupled to two or more of the fittings 170, respectively.

To facilitate removing the molded articles from the cavity blocks 94' and 76', the bottom lift pin assembly including its actuating cylinder 48 and lifter rods 56 is operated to raise the bottom lift plate 26' a short distance. This operation raises a lower lift pin 362 aligned with each mold cavity 30' a short distance to separate the molded articles 352 from the lower cavity block 94'. The molded articles therefor cling to the underside of the upper cavity block 76' as the molding machine platens are separated. Adjacent the upper limit of travel of the movable platen 72 (FIGURE 1) the ejector assembly is actuated in the manner described above in connection with FIGURES 1 and 2 of the drawings to separate the molded parts 352 from the upper cavity block 76'. In furtherance of this purpose, the ejector plate 98 (FIGURE 2) is provided with a different array of ejector pins 364 and 366 as required to eject the molded parts 352 and the connecting stringers 358 from the cavity block 76'. The connected parts are then transferred into the hopper 110 by the air ejector means 212 and shield plate 188 (FIGURES 2–4) when the transfer mechanism is swung inwardly to its operating position, as described above in connection with the preceding figures.

When the die assemblies 14' and 40' are again closed, the upper ejector pins are withdrawn, of course, by the biasing action of the coil springs 106. The lift pins 362 can be withdrawn by reverse actuation of the actuating cylinder 48 or alternatively a number of return pins 368 can likewise be secured to the lower lift plate 26' for operation through vertical passages 370 in the lower die assembly 14'. In this example, the return pins 368 project a short distance above the upper surface of the lower cavity block 94' for engagement by the lower surface of the upper cavity block 76' to ensure return of the lift plate 26' and the lift pins 362 to their retracted positions, as shown in FIGURE 12. As noted above in the description of FIGURE 1, the operation of the transfer cylinder 44 is controlled by valve 50, which in turn is actuated by suitable circuit means (not shown).

*Alternative metering and transfer mechanism*

Referring now to FIGURE 11 of the drawings, another arrangement of the molding machine is illustrated wherein upper and lower die assemblies 390 and 392 are secured to upper and lower platens 72' and 12' in the manner described previously. In this arrangement, mold cavities 394 and forces 396 are arranged in at least two parallel rows and in an unstaggered or transversely linear array. The construction of the die assemblies 390 and 392 is otherwise similar to the die assemblies 14 and 40 of FIGURES 1 and 2 with the exception that an additional, central spacing plate 398 or 400 is secured on edge in each of the assemblies. The upper platen 72' is mounted for vertical sliding movement on the posts 58' to the upper ends of which is secured a fixed supporting plate 402. In the arrangement of FIGURE 11, the cylinder, toggle arrangement and associated components for raising and lowering the movable platen 72' have been omitted for purposes of clarity.

The fixed supporting plate 402 is generally similar to the supporting plate of FIGURES 1 and 2, and carries on it the operating cylinder control box and associated components (not shown in FIGURE 11) of the machine. The supporting plate 402 is additionally provided with a pair of fixed brackets 404 which are employed as described more fully below for supporting components of the transfer mechanism.

In certain applications of the invention employing dual rows of mold cavities 394 the transfer mechanism 146 of FIGURES 1–4 can be adapted for this purpose by bending the ends of the chutes 154 so as to meet with the in-line cavities 394. However, where the cavities 394 are relatively closely spaced, it is more practical to provide a transfer mechanism 406 having an equivalent number of rows of chutes 408 and 410. In this arrangement two such rows of chutes 408, 410 are employed; however, where additional rows of cavities 394 (not shown) are provided, additional rows of chutes can be likewise provided in accordance with this modification of the invention.

The chutes 408 and 410 are secured to clamp fitting 412 and 413 respectively in communication with passages 414 or 415 extending therethrough. Each row of fittings 412 and 413 is secured to a supporting bar 416 and the bars 416 in turn are secured to a pair of crossbraces 418 at their respective ends. The fittings 412 in the outer row are provided with greater vertical dimensions to accommodate the higher elevation of the associated feed spindle 116'b, described below.

Each crossbrace is pivotally secured at its ends to a pair of parallel swing arms 420 and 422 of approximately equal lengths. Each pair of the swing arms 420 and 422 are pivotally secured at their upper ends as denoted by reference characters 424 and 426 to the fixed cantilevered bracket 404 of the supporting plate 402 and to the supporting plate 402 respectively. The distance 428 between the pivotal connections 424 and 426 is equal to the distance between the pivotal connections 430 and 432 of the associated crossbrace 418 so that the swing arms 420 and 422, the crossbrace 418 and the portions of the fixed bracket 404 and supporting plate 402 between the pivot connections 424 and 426 thereon form a pantograph. Accordingly, the crossbraces 418 at each end of the transfer mechanism 406 always remain parallel to the upper supporting plate 402 and its bracket 404. With the arrangement therefore as shown in FIGURE 11, the crossbraces 418 and supporting bars 416 always define a horizontal plane irrespective of the position of the transfer mechanism 406 in its path.

The transfer mechanism 406 is illustrated in FIGURE 11 in its charging position which occurs when the upper and lower platens 72' and 12' are fully separated. The mechanism 406 is swung through an arcuate path 92' by link member 434, which is pivotally joined to the upper platen 72' as denoted by reference character 436, and at its lower, bifurcate portion to the pivot connection 432 between the crossbrace 418 and the swing arm 422. If desired, a similar link member (not shown) can be similarly joined to the rearward end of the upper platen 72′ and to the rear crossbrace pivot to lend stability to the transfer mechanism. The link member or members 434 otherwise function in the same manner as the link member 194 of FIGURES 3 and 4.

Inasmuch as the swing arms 420 and 422 do not pass their vertical positions (as viewed in FIGURE 11) while moving through the path 92′ of travel of the transfer mechanism 406, the pantograph support at each end of the transfer mechanism conveys the transfer tubes 408 and 410 through a downward arc so that their outlets can approach the mold cavities 394 very closely, as set forth in the description of the transfer mechanism 146 (FIGURES 1–4).

In this arrangement of the transfer mechanism 406 the forward row of chutes 408 desirably is provided with a shield or baffle 188′. The shield 188′ preferably is provided with an upstanding portion 438 along the upper edge of which are a series of apertures for receiving air jet tubes 440 and 442. In this arrangement the tubes 442 are extended beyond the ends of tubes 440 so that the air blasts therefrom can be delivered adjacent the right hand row of forces 396. The tubes 440 and 442 are coupled to a fitting 230′ similar to that described with reference to FIGURES 1–4.

The leading edge portion of the shield 188′ is similarly provided with air sweep means 212′. The air sweep means 212′ and the air ejection means 214′ are similarly operated by a pair of valves (not shown) similar to the valves 226 and 228 illustrated in FIGURES 1 and 2 of the drawings.

In order to supply molding powder to the generally parallel rows of fittings 412 and thence to the chutes 408 and 410, a bin or hopper 444 is provided having lower delivery portion 446 which is substantially closed by a pair of cylindrical spindle housings 448 and 450. In this example, the cylindrical housings 448 and 450 are separately joined by a coextending generally planar member 452 to complete the closure of the lower delivery portion 446 of the hopper 444.

A pair of feed spindles 116′ are rotatably mounted in close fitting engagement with the cylindrical housings 448 and 450 respectively, preferably in the manner described above in connection with the spindle 116 and the housing 120 of FIGURES 1–4. The feed spindle 116′a is provided with a pair of similar gearing segments 454 and 456 which together extend circumferentially and completely around the feed spindle 116′a, while the feed spindle 116′b is provided with a single, generally semicircular gearing segment 458 which is positioned on the feed spindle 116′b in the manner of the gearing segment 142 of FIGURES 3 and 4. All of the gearing segments 454–458 desirably are mounted in a central circumferential groove of the feed spindles 116′, similar to the groove 144 of FIGURE 5.

In order to operate the feed spindle 116′a a rack 138′ is slidably mounted on the hopper 444 as illustrated in FIGURES 1–4. The rack 138′ cooperates with a feed actuating plunger 148′ as described above in connection with the plunger 148 and rack 138 of FIGURES 1–4. Therefore, in the closed position of the upper platen 72′ as illustrated, the feed spindle 116′a has been rotated to its unloading position. The feed spindle 116′b has similarly been rotated to its unloading position by means of an intervening idler gear 460 mounted on shaft 462 and positioned between the feed spindles 116′. When thus positioned, the gear 460 is enmeshed with the single gearing segment 458 of the feed spindle 116′b and with the gearing segment 456 of the feed spindle 116′a. Accordingly, the feed spindles 116′ are each rotated in the same direction so that the feed spindle 116′b also is moved to its unloading position as shown in FIGURE 11. It will be obvious that other driving linkages can be coupled between the spindles 116′a and 116′b, for example a chain and a pair of sprockets.

When the upper platen 72′ is moved downward to its closed position the rack 138′ and the gear 460 rotate the spindles 116′ respectively in their reverse directions so that the powder compartments 124′ thereof are respectively aligned with the feed openings 122′a and 122′b in the cylindrical housings 448 and 450 respectively. In the latter position (not shown) each spindle 116′ is positioned at its loading station in a manner similar to that of the feed spindle 116 of FIGURE 3. It will be understood that an additional feed spindle or spindles (not shown) can be similarly mounted in the bottom portion of a hopper similarly adapted therefor, where additional row or rows of chutes are required as set forth above.

*The operation of the molding machine*

Referring again to FIGURES 1–4 of the drawings, before commencing automatic operation of the molding machine the upper platen 72 is raised to its upper limit of travel by manual operation of the valve actuator 300. The actuator 300 is then locked in position by valve lock 302. With the upper platen 72 thus retracted, appropriate die assemblies 14 and 40 are secured respectively to the upper and lower platens 72 and 12 by manipulation of clamps 16, in the case of the lower die assembly 14, and by securing mounting screws 82, in the case of the upper die assembly 40. Before mounting the die assemblies 14 and 40, however, suitable arrays of ejector pins 92 and lift pins 28 are mounted on the ejector plate 98 and the lift plate 26 respectively for example by means of retaining plates 372 and 374. During these preparatory operations, the transfer mechanism and associated components can be locked adjacent outward limit of travel by manually lifting the transfer mechanism through its arcuate path and depressing the swing withholding plunger 200 against the action of its spring 380. With the plunger thus held, the transfer mechanism is permitted to move downwardly a slight distance until the associated swing arm 180 engages plunger rod 382. At this point the plunger 200 can be released so that its inner headed end 202 engages and is retained by the swing arm 180. When it is desired to release the transfer mechanism 146 for subsequent automatic operation of the molding machine, the transfer mechanism is merely lifted slightly to permit the plunger 200 to return to its inoperative position as shown in FIGURE 1, thereby freeing the transfer mechanism 146.

After placing a suitable quantity of molding powder within the hopper 114, the transfer mechanism can be released as noted above and the manual operator 300 likewise can be released and thereafter the movable platen 72 and associated components can be actuated through one or more cycles manually, if desired, in order to ascertain the proper alignment of the delivery chutes 154 with the mold cavities 30.

The adjustable timer mechanism 108 is then set to the proper length of curing cycle. In this example, the timer 108 is adjustable from 0 to 150 seconds, although it will be obvious that other timing ranges can be employed depending upon the type of molding material and the size of the articles being molded and the operating temperatures of the die assemblies 14 and 40.

During these operations, the heaters 36 and 37 of the lower and upper die assemblies can be energized through suitable supply circuits in order to preheat the die assemblies to the desired operating temperatures as appropriately set by thermostats 38 and 42. When the desired temperautres are attained, the molding machine is now prepared for automatic operation, which is initiated by on-off switch 298.

With the platens 12 and 72 in their closed positions, the feed spindle has been rotated to its loading position as illustrated in FIGURE 3 of the drawings. At the same time, the transfer mechanism is held in its retracted or inoperative position by the link members 194. As the upper platen 72 is raised, the feed spindle is rotated toward its dumping position and the transfer mechanism falls by gravity engagement with the link members 194 toward its powder delivery position between the platens. The feed spindle 116, however, does not begin to rotate until the feed plunger 148 mounted in the upper platen 72 engages the upper end of the lost motion slot 152. In this example, air sweep means 214 is turned on as the transfer mechanism begins its downward path of travel. At the lowermost position of the platen 72, the link members 194 desirably are positioned below the horizontal as viewed in FIGURE 2, to provide in effect a "lost motion" arrangement so that the transfer mechanism initially is moved upwardly during the first increment of platen movement in order to delay inward movement of the transfer mechanism until the upper platen is sufficiently retracted.

Continued upward movement of the platen 72 causes the feed actuator 148 to engage the upper end of the lost-motion slot 152 in the feed spindle rack 138 to commence rotation of the feed spindle 116 toward its dumping or unloading position. Such rotation is substantially completed at the upper limit of platen movement, at which time the feed spindle is moved to its dumping position as shown in FIGURE 4. At the same time the link members 194 are positioned as shown in FIGURE 4 and the delivery chutes 154 of the transfer mechanism are juxtaposed to the openings of the mold cavities 30 by engagement on stop 206 as likewise shown in FIGURE 4.

The feed spindle 116 and the chutes 154 therefore are properly positioned as the ejector rods 100 engage the stops 104 in the upper stationary support 60. At this point in the path of travel of the platen 72, the air jet valve 228 is actuated by engagement of its actuating arm with the cam 244 and the air blasts are commenced as continued upward movement of the movable platen 72 causes the ejector pins 96 to protrude from the forces 92. This small additional increment of upward movement to extend the ejector pins is terminated by actuation of the limit switch 278 by the lower collar 280 and actuator spring 282.

The upward movement of the platen 72 is slowed during the last-mentioned increment of path travel by a flow regulating and silencing mechanism 384 of known construction coupled to the exhaust outlets of the cylinder actuating valves (not shown) positioned within the control box 276. This delay not only cushions the shock of the operating parts of the cylinder 66 and toggle arrangements 70, but in addition affords ample time for dumping of the powder from the compartments 124 of the feed spindle 116 into the opening 170 of the transfer tube fittings 168 and for flowing of the powder downwardly by gravity through the transfer tubes 154 and into the cavities 30. It will be understood, of course, that premature dumping of the powder from the spindle as the latter is rotated is prevented by the outward edge 386 of the spindle housing 120, as better shown in FIGURE 4 of the drawings. As the molding powder is being thus delivered the air ejection means 212 is actuated at this time as noted above to blow the finished molded parts 236 from the protruded ejector pins 96 and into the storage bin 110, which is provided with a vertical opening 388 for this purpose.

However, before the aforementioned air ejector means is actuated, the operation of the air sweep means 214 is terminated before commencement of the final upward increment of platen travel when the actuating arm of the air sweep valve 226 leaves the lower end of the cam 242, thereby permitting the valve to close. This operation not only ensures adequate air pressure for operation of the air ejector means 212, but also terminates the operation of the air sweep means 214 before the latter again passes over the cavities 30 during the outward, return swing of the transfer mechanism 146 to avoid blowing molding powder from the cavities.

The actuation of the limit switch 278 by engagement with lower spring contact 282 resets the timer mechanism 108 which in turn de-energizes the appropriate solenoid valve to permit the latter's spring return to operate cylinder 66 and platen 72 in their downward directions. In the outward swing of the transfer mechanism is delayed until the platen 72 descends sufficiently to take up the last motion associated with the link member slots 198 and represented in FIGURE 4 by the position taken by stripper bolt 184a at the upper limit of platen movement. The feed spindle 116 does not begin to rotate back to its powder loading position (FIGURE 3) until the feed plunger 148 engages the bottom end of the lost-motion slot 152 in the rack 138. Thereafter, the feed spindle is rotated until the movable platen 72 descends to its lower limit of movement. Shortly after the platen 72 begins its downward movement, the actuating arm of the air ejector valve 228 is released, and continued downward movement of the upper platen 72 causes the operating cam 242 for the air sweep valve 226 to by-pass the actuating arm as the cam member 249 is moved out of the way by virtue of its limited pivotal mounting.

Adjacent the lower limit of platen movement, the shouldered forces 92 enter the mold cavities 30 to compress the powder therein. As the powder melts and becomes increasingly compressed, the platen 72 continues its downward movement, under the operating force of the cylinder 66, to its lower limit of travel as determined by the toggle mechanism 70, which defines the size or thickness of the bottom portion of the molded articles 236. At this point, the upper contact spring 282 actuates the limit switch 278 to reset timer 108 and extinguish warning lamp 194. The lower platen is held in this position by the cylinder 66 and the locked toggle mechanism 70 until the timing mechanism 108 conventionally actuates the associated control valve at the end of the curing cycle to commence upward movement of the platen for the succeeding cycle. At the same time the left cylinder 18 is actuated by the timer mechanism 108 to apply lifting force to the lower lift plate 26 and the lift pins 28 mounted thereon.

However, the lift pins are permitted to move upwardly only with upward movement of the movable platen 72 to avoid damaging the bottom surfaces of the newly cured molded articles 236. The controlled upward movement of the lift pins 28 is effected by engagement of the leader pins 95 secured to the upper mold plate 76 and the detainer pins 99 secured to the lower or lift plate 26. This arrangement ensures retention of the molded articles 236 on the forces 92 as the latter are removed from the mold cavities 30. The molded articles remain in this position throughout the major proportion of the upward movement of the movable platen 72 until the articles are removed from the forces by operation of the ejector pins and air ejector means described above.

When the molding machine of the invention is operated for transfer molding, the transfer mechanism 146 is similarly operated with the exception that the powder is transferred by one or more of the chutes 154 into the central pot 346, where it is subsequently compressed, melted and transferred into cavities 30' (FIGURE 12). Minor modifications of the transfer and/or feed mechanism, may be required as set forth above.

From the foregoing it will be apparent that novel and efficient forms of automatic molding machinery have been disclosed herein. The molding machinery is capable of adaptation to a wide variety of molding tasks using a wide range of molding materials. The machine is particularly adapted for rapid cyclic operation and the length of the cycle is determined primarily by the curing time of a given molding material, inasmuch as the powder charging, article ejecting, and air sweep and related operations are performed in a matter of seconds during the upward and downward movements of the movable platen 72. The molding machine, moreover, is arranged for quick and easy removal and replacement of the die assemblies used therein.

While there have been shown and described certain presently preferred embodiments of the invention together with presently preferred methods of practicing the same, it is to be distinctly understood that the invention is not limited thereto but can be otherwise variously embodied and practiced within the scope of the following claims.

I claim:

1. In an automatic molding machine, the combination comprising a fixed platen having a mold die assembly thereon, a movable platen having a complementary mold die assembly thereon, a guideway structure for mounting said movable platen for movement toward and away from said fixed die assemblies, a fixed supporting plate mounted adjacent the end of said guideway structure at a position removed from said platen, an actuating mechanism and control means therefor mounted on said support plate for reciprocating said movable platen toward and away from said fixed platen, limit switch means mounted on said supporting plate for actuating said control means, a switch actuating rod secured adjacent its end to said movable platen, said rod slidably extending generally parallel to said guideway structure and through rod aperture therefore in said supporting plate for movement relative thereto and to said switch means with said movable platen, and a pair of switch actuators spacedly and adjustably mounted on said rod and positioned to engage said switch means at predetermined limits of travel of said movable platen, the spacing between said actuators along said rod setting said travel limits.

2. The combination according to claim 1 wherein additional de-gassing switch means are coupled to said control means, and a second actuator is mounted on said rod, said second actuator having guiding and switch engaging means positioned thereon and movable relative to said rod, said last-mentioned means being movable to a first position of engagement of its guiding means with cooperating guiding means mounted on said supporting plate so that said de-gassing switch means are actuated during each reciprocating movement of said movable platen and to a second position of non-engagement of said second actuator guide means with said cooperating guide means so that said de-gassing switch means are not actuated by said second actuator.

3. The combination according to claim 2 wherein said switch engaging means are a pair of spaced fingers mounted in said second switch actuator and extending to one side thereof, and said guiding means and said cooperating guide means are a pin and a pair of relatively closely spaced camway means disposed to guide said pin through one of said camways during forward movement of said second actuator and through the other during reverse movement so that said second actuator is rotated to a limited extent on said rod to cause one of said fingers to actuate said de-gassing switch means and the other of said fingers to de-activate said de-gassing switch means.

4. In an automatic molding machine, the combination comprising a fixed platen having a mold die assembly thereon, a movable platen having a complementary mold die assembly thereon, a guideway structure for mounting said movable platen for movement toward and away from said fixed die assemblies, a fixed supporting plate mounted adjacent the end of said guideway structure at a position removed from said platens, a bin structure for molding material or the like secured to said supporting plate, said bin having a lower delivery opening disposed adjacent the path of movement of said movable platen, said opening being substantially closed by a generally cylindrical feed spindle housing extending thereacross and having a plurality of feed openings therein, said feed spindle having a plurality of feed compartments therein alignable respectively with said feed openings at a given angular displacement of said feed spindle, means for rotatably mounting said spindle in close fitting engagement with said housing, and mechanical linkage coupled to said movable platen for rotating said spindle between said aligned position and a spindle dumping position in response to movements of said movable platen.

5. The combination according to claim 4 wherein said mechanical linkage includes a rack member, cooperating means mounted on said movable platen for engaging and moving said rack member, said member being enmeshed with a gearing segment mounted on said feed spindle and extending circumferentially thereof.

6. The combination according to claim 5 wherein said rack member is slidably mounted on said bin adjacent said spindle and the path of movement of said movable platen, and an operating rod is mounted on said platen and engages said rack to move said rack with said platen.

7. The combination according to claim 6 wherein a lost-motion slot is formed in said rack member, said slot being elongated in the path of movement of said rack member and said movable platen, and said operaing rod is engaged in said slot to permit limited movement of said movable platen through a portion of its path of movement without rotating said freed spindle.

8. The combination according to claim 6 wherein said operating rod is slidably mounted on said platen for longitudinal movement thereof toward and away from said rack, and means are provided for biasing said actuating rod into engagement with said rack member and for withdrawing and locking said rod at a position of disengagement with said rack member.

9. The combination according to claim 4 wherein transfer chute means are insertable between the dumping position of said feed spindle and the mold openings of one of said die assemblies for transferring molding powder and the like respectively from the feed compartments of said spindle to the mold openings in one of said die assemblies, said chute means being secured to the end portion of swing arm means, the other end portion of which is pivotally connected to said supporting plate, and a link member is pivotally connected adjacent its ends respectively to said movable platen and to said swing arm means so that said chute means are moved toward said inserted position when said movable platen is withdrawn from said fixed platen and are swung away from said inserted position when said movable platen is moved toward said fixed platen.

10. The combination according to claim 9 wherein the adjacent end portion of said swing arm means is pivoted to said supporting plate at a point at or past the center line of said machine and said one die assembly from said chute means so that the motion of the latter prescribes an arc of movement toward said mold openings when approaching said one die assembly.

11. The combination according to claim 9 wherein the pivot connection of said link member with said platen is on a horizontal plane below that of the pivot connection of said link member with said swing arm means so that said transfer chute means initially are swung outwardly through a relatively short distance before commencing their inward swing in order to provide adequate separation between said platens to receive said transfer chute means therebetween.

12. The combination according to claim 9 wherein said link member is provided with a lost-motion slot therein at the pivot connection thereof with said swing arm means, and said guideway structure is positioned for vertical movement of said movable platen toward and away from said fixed platen so that said chute means move by gravity in a descending arcuate path toward said one die assembly, said one assembly being mounted on said fixed platen.

13. The combination according to claim 12 wherein stop means are mounted on said machine and positioned to terminate the inward swing of said transfer chute means before said movable platen reaches its uppermost position, the length of said slot being sufficient to permit said platen to be moved to said uppermost position and to return to disengage said stop means, said mechanical linkage being positioned to rotate said spindle to and away from said dumping position while said stop means and said lost-motion slot maintain said transfer chute means motionless at said dumping position to complete delivery of said molding material to said mold openings.

14. The combination according to claim 4 wherein transfer chute means are insertable between the dumping position of said feed spindle and the mold openings of one of said die assemblies for transferring molding powder and the like respectively from the feed compartments of said spindle to the mold openings in one of said die assemblies, and a shield structure is secured to said chute means, said shield structure substantially covering said one die assembly at the inserted position of said chute means to prevent particles of flashing and other foreign material from passing thereto.

15. The combination according to claim 14 wherein air sweep means are mounted on said shield structure for cleaning said one die assembly as said chute means are moved to their inserted position.

16. The combination according to claim 14 wherein at least one air ejector tube is mounted on said shield structure and positioned to direct a stream of air toward said other die assembly at the inserted position of said chute means to aid in removing molded articles therefrom.

17. The combination according to claim 15 wherein air ejector means are mounted on said shield structure for directing air streams toward said other die assembly at the inserted position of said chute means to aid in removing molded articles therefrom, said air ejector means including a plurality of tubes extending through individual apertures in said shield structure and positioned to direct air streams respectively against molded articles as they are removed from said die assemblies.

18. The combination according to claim 17 wherein said valve means are actuated by camming members forming part of said valve actuating means, one of said camming members being disposed to actuate said air fitting valve means adjacent the far limit of travel of said movable platen relative to said fixed platen and the other of said camming members being positioned and shaped to actuate said air sweep valve means adjacent the nearer limit of movable platen travel and to terminate such actuation before actuation of said air fitting valve means by said one camming member.

19. The combination according to claim 4 wherein said die assemblies include at least two rows of molding means, said bin is provided with a like number of cylindrical housings, a like number of feed spindles are respectively and rotatably mounted therein, one of said feed spindles being mechanically linked to movements of said movable platen for rotating said feed spindle, and a gearing train is coupled between said one spindle and the remainder of said spindles for similarly rotating said remainder.

20. The combination according to claim 19 wherein a transfer mechanism is pivotally mounted on said supporting plate and is provided with a like number of rows of transfer chutes insertable respectively between said feed spindles and the molding cavities of one of said die assemblies by pivotal movement of said mechanism.

21. The combination according to claim 20 wherein said rows of chutes are mounted on a pantograph including at least one pair of parallel swing arms pivotally mounted on the adjacent edge of said supporting plate, and said chutes are moved toward and away from inserted position by a link member having its ends pivotally mounted on said movable platen and on said pantograph respectively.

22. The combination according to claim 4 wherein said feed compartments are generally circular in cross-section and extend transversely through said spindle, said compartments being threaded throughout their lengths, and a threaded volumetric adjustment slug is threadedly engaged in each of said compartments.

23. The combination according to claim 22 wherein each of said compartment threads is truncated to minimize interference to molding powder flowing into and out of said compartments.

24. The combination according to claim 4 wherein transfer mechanism is movable to and away from the dumping position of said spindle, said mechanism including a plurality of powder transfer chutes alignable with said cavities at said dumping position, each of said chutes being pivotally mounted on said mechanism, the axes of said pivot mountings being respectively aligned with said feed compartments at the dumping position of said spindle.

References Cited

UNITED STATES PATENTS

| 2,627,086 | 2/1953 | Hallenbeck. |
| 2,781,546 | 2/1957 | Hallenbeck et al. |
| 2,933,763 | 4/1960 | Alesi. |

FOREIGN PATENTS

| 694,264 | 7/1953 | Great Britain. |
| 103,117 | 11/1941 | Sweden. |

J. HOWARD FLINT, JR., *Primary Examiner.*

UNITED STATES PATENT OFFICE
CERTIFICATE OF CORRECTION

Patent No. 3,380,117                  April 30, 1968

William Gluck

It is certified that error appears in the above identified patent and that said Letters Patent are hereby corrected as shown below:

Column 4, line 53, "actuting" should read -- actuating --. Column 5, line 48, "with drawn" should read -- withdraw --. Column 8, line 28, in the Sub-Title, "power" should read -- powder --. Column 10, line 31, "power" should read -- powder --; line 39. "mol" should read -- mold --. Column 14, line 72, "plates" should read -- platen --. Column 18, line 35, after "adjacent" insert -- their --. Column 21, line 35, after "second" insert -- switch --. Column 22, line 23, "freed" should read -- feed --.

Signed and sealed this 7th day of October 1969.

(SEAL)
Attest:

Edward M. Fletcher, Jr.
Attesting Officer

WILLIAM E. SCHUYLER, JR.
Commissioner of Patents